United States Patent [19]

Perry et al.

[11] 4,246,092
[45] Jan. 20, 1981

[54] METHOD AND APPARATUS FOR THE PERFORMANCE OF SELECTIVE ELECTRODIALYSIS

[75] Inventors: Mordechai Perry, Petach Tikvah; Charles Linder; Ora Kedem, both of Rehovot, all of Israel

[73] Assignee: Research Products Rehovot Ltd., Rehovot, Israel

[21] Appl. No.: 973,963

[22] Filed: Dec. 28, 1978

[30] Foreign Application Priority Data

Jan. 8, 1978 [IL] Israel .................................. 53764

[51] Int. Cl.³ ............................................. B01D 13/02
[52] U.S. Cl. ................................ 204/301; 204/180 P; 521/27
[58] Field of Search ................... 204/180 P, 301, 296; 521/27

[56] References Cited

U.S. PATENT DOCUMENTS

| 3,510,418 | 5/1970 | Mizutani et al. | 204/301 X |
| 3,579,288 | 5/1971 | Süszer | 204/296 X |
| 3,714,010 | 1/1973 | Süszer | 204/301 X |
| 3,743,588 | 7/1973 | Brown, Jr. et al. | 204/296 X |
| 3,847,772 | 11/1974 | Sata et al. | 204/180 P |
| 3,933,610 | 1/1976 | Ehara et al. | 204/180 P |
| 4,119,581 | 10/1978 | Rembaum et al. | 521/27 |

Primary Examiner—Arthur C. Prescott

[57] ABSTRACT

The invention provides a method for the performance of selective electrodialytic separation of a first group of charged ions from a solution containing other charged ions having the same sign and optionally the same valence as said first group comprising applying a current to an electrodialysis unit comprising at least one thin, dense, non-porous charged electrodialysis membrane made of water-insoluble hydrophobic polymeric material, containing covalently bound ionizable groups, wherein said membrane separates at least one diluting compartment from at least one concentrating compartment in said unit and wherein said membrane is in the form of a polymeric matrix optionally supported on a porous support and having a preselected dielectric constant and composition adapted to induce selective ion disassociation of said first group of charged ions whereby there is achieved a substantial ion migration of said selected ion group and its preferential transference across said membrane at a fraction larger than its relative concentration in said solution. The invention also provides a selective electrodialysis unit per carrying out said method.

7 Claims, No Drawings

METHOD AND APPARATUS FOR THE PERFORMANCE OF SELECTIVE ELECTRODIALYSIS

The present invention relates to method and apparatus for the performance of selective electrodialysis. More specifically the present invention relates to the novel use of known and new membranes specially adapted to effect the selective electrodialytic separation of a first group of charged ions from a solution containing other charged ions having the same sign and optionally even the same valence as those of said first group.

Electrodialysis is the transport of ions through membranes as a result of an electrical driving force. A standard electrodialysis unit consists of a number of thin compartments through which solutions containing dissolved electrolytes are pumped. These compartments are separated by alternate cation and anion exchange membranes, which are spaced about 0.3–2.0 mm apart. The end compartments contain electrodes. When electric current passes through the solution compartments and membranes, cations tend to migrate towards the negatively charged electrode (cathode) and anions tend to migrate towards the positively charged electrode (anode). The arrangement of the anion and cation exchange membranes is such that half of the solution compartments are enriched with the ions, and the other includes the diluted stream.

Thus the normal electrodialysis unit generally uses permselective membranes adapted to separate positive from negative charged ions wherein the positive ions pass through a cation exchange membrane and the negative ions pass through an anion exchange membrane.

The major application of electrodialysis is in water desalination. However, it can and has been used for the concentration of electrolytes and for the removal of salts from aqueous mixtures of organic substances and electrolytes.

The application of electrodialysis in order to separate selectively between charged species having the same electric charge is of great potential use, and has been tried in part without significant success. The principle that has been utilized was based on selective complexation of some specific ion by the charged group incorporated within the membrane. By this mechanism the total membrane concentration of the desired ion could be increased but at the same time its mobility was significantly reduced due to higher attraction of this ion by the selective site, thus losing the selectivity. Indeed, the latter may be the decisive effect, and this has led to disappointments in attempts at specific cation removal. However, decreased mobility is not a necessary consequence of preferred uptake, especially when there is no specific complexation, but a general solubility effect. A careful evaluation of membrane performance may make an optimization possible. Thus it has now been found that in order to endow membranes which specificity towards some ion, the properties of the membranes should be distinguishable from those of aqueous solution with respect to dielectric constant, solubility and ionic dissociation. For example, the ion selective transport through the membrane can be achieved due to selective dissociation of this ion within a membrane of preselected dielectric constant when specific interaction of said ion with the matrix exists.

According to the present invention there is now provided a method for the performance of selective electrodialytic separation of a first group of charged ions from a solution containing other charged ions having the same sign and optionally the same valence as said first group, comprising applying a current to an electrodialysis unit comprising at least one thin, dense, non-porous charged electrodialysis membrane made of water insoluble hydrophobic polymeric material containing covalently bound ionizable groups, wherein said membrane separates at least one diluting compartment from at least one concentrating compartment in said unit and wherein said membrane is in the form of a polymeric matrix optionally supported on a porous support and having a preselected dielectric constant and composition adapted to induce selective ion dissociation of said first group of charged ions, whereby there is achieved a substantial ion migration of said selected ion group and its preferential transference across said membrane at a fraction larger than its relative concentration in said solution.

Also provided is a selective electrodialysis unit adapted for the performance of selective electrodialytic separation of a first group of charged ions from a solution containing other charged ions having the same sign and optionally the same valence as said first group comprising at least one thin, dense non-porous charged electrodialysis membrane made of water-insoluble hydrophobic polymeric material, containing covalently bound ionizable groups, wherein said membrane separates at least one diluting compartment from at least one concentrating compartment in said unit and wherein said membrane is in the form of a polymeric matrix optionally supported on a porous support and having a preselected dielectric constant and composition adapted upon the passage of current therethrough to induce selective ion dissociation of said first group of charged ions and thereby to effect a substantial ion migration of said selected ion group and its preferrential transference across said membrane at a fraction larger than its relative concentration in solution.

In the article Cellulose-Based Permselective Membranes by A. Suszer published by the National Council for Research and Development Negev Institute for Arid Zone Research July 1971 there is described the search for inexpensive permselective membranes for use in electrodialysis as follows: "Commercially available plastic-based ion-permselective membranes for electrodialytic water desalination are expensive. In an attempt to find less expensive membranes by using cheaper raw materials for the membranes, cellulose-based sheets, such as cellophane, parchment paper, kraft paper and partially deacetylated acetyl cellulose were chosen for this research. These raw materials are readily available at relatively low prices and in various qualities.

In this research work the cellulosic raw materials were treated with fibre active dyes and with other fibre active, colorless compounds which contain acid or basic functional groups. The fibre active compounds and especially the fibre active dyes contain labile halogen atoms or other reactive groups which can be split off in alkaline medium. On reaction with the free hydroxyl groups of the cellulose the fibre active compounds establish covalent ether or ester bonds. In this way, the fibre active compound, together with its negatively or positively charged functional groups, becomes an integral part of the macromolecule of the membrane material.

Additional research was done on the preparation of anion-exchange membranes, by treating cellulosic raw materials with polyethylene imine. As it is not a reactive compound, it must be fixed on the cellulosic material by cross-linking".

However, as stated said article is directed to permselective membranes and not selective membranes.

Furthermore said article also concludes that "because of the availability of a greater variety of sizes and widths of parchment paper sheets this material is at present considered to be most feasible for this purpose. Best cationic membranes were obtained with the Procion Supra dyes of I.C.I. and best anionic membranes were obtained with polyethylene imine." Thus said article constitutes a further teaching away from the membranes of the present invention.

Similarly in the article Ion Separation by Hyperfiltration Through Charged Membranes. II Separation Performance of Collodion-polybase Membranes, by Erica Hoffer and Ora Kedem IEC Process Design and Development Vol. II page 226 April 1972, there is described the use of charged membranes which could be abstracted as follows:

"Appreciable separations between divalent or trivalent salt solutions and corresponding mineral acids can be achieved by hyperfiltration of mixtures through loose ion-exchange membranes. Porous charged membranes allowing high rates of volume flow were prepared by cross-linking of polyamines into a porous collodion matrix or by reaction of polyamines with a chemically modified collodion matrix. Hyperfiltration of salt-acid mixtures through these membranes gave enrichment of acid in the product and concentration of salt in the feed. The gap between rejections was larger in hyperfiltration of mixtures than in hyperfiltration of separate solutions."

Specifically exemplified are collodion membranes, polyvinylamine membranes and polylysine-polytyrosine membranes. As can be seen, however, said article is specifically and solely directed to hyperfiltration and does not teach or suggest the use of charged membranes for selective electrodialysis.

The membranes used in the process and apparatus of the present invention are preferably selected from the group consisting of assymetric, composite and thin-supported charged membranes, made of water insoluble hydrophobic polymeric material.

The material utilizable for the preparation of the membrane matrix according to the present invention is a polymer modified with covalently attached ionizable groups where the starting polymer is for example:
cellulose acetate;
cellulose acetate butyrate;
cellulose triacetate;
polystyrene;
PVC; or polyethylene.

As ionizable groups may be used, for instance sulfato groups, sulfonic acid groups, carboxylic acid groups, primary, secondary or tertiary amino groups and quaternary ammonium groups. These ionizable groups are covalently attached to the polymers directly or via other groups.

While it was initially believed that the method of the present invention could also be satisfactorily carried out with a moderately charged hydrophobic matrix wherein the charged groups are merely embedded or entrapped in the hydrophobic matrix, as opposed to being covalently bound therein, further research and development have now proven that such matrices, namely those containing nonpolymeric and polymeric additives embedded in the polymer suffer from several disadvantages leading to membrane performance which is significantly inferior to the performance of the membranes made of polymers having covalently bound ionizable groups.

While specific comparative examples demonstrating the inferior performance of embedded membranes will be given below, the disadvantages may be classified into two categories:

(a) The unbound, low molecular weight ionizable additives embedded in the membrane are mobile, and therefore may be eluted from the membrane under the influence of the applied electric field, after a relatively short time. After the elution, the performance of the membrane with respect to selective ionic transport is lost.

(b) The problem of the elution of the low molecular weight ionizable groups can be solved by increasing significantly their molecular weight. Therefore the incorporation of polymeric additives embedded in the polymer matrix could in principle, solve this problem. However, the compatibility of these polymeric additives and the uncharged membrane matrix are limited. The introduction of about 20% w/w of the polymeric additive into the matrix leads to the formation of mechanically unstable membranes with bad performance. On the other hand the electrical resistance of the membranes having lower concentration of the polymeric additives is too high for all practical purposes.

While the invention will now be described in connection with certain preferred embodiments in the following examples in order that the invention may be more fully understood, it will be understood that it is not intended to limit the invention to these particular embodiments. On the contrary it is intended to cover all alternatives, modifications, and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be most useful and readily understood description of procedures as well as of the principles and conceptual aspects of the invention.

The membranes used in the present invention were prepared by casting from solutions of cellulose acetate (CA) or cellulose triacetate (CTA) in organic solvents such as chloroform, acetone or an acetone-formamide mixture. The charged groups varying in concentration from 5–1000 mMoles/kg polymer, were incorporated into the membrane by covalently binding the aforementioned ionizable groups to a membrane-forming polymer which was then used for the preparation of a membrane.

Three types of membranes were prepared:
(i) thin dense films having a thickness of 2–20 microns;
(ii) asymmetric Loeb-type membranes;
(iii) composite membranes prepared by coating a thin layer of selective membrane material upon a porous support.

Referring more specifically to said three types of membranes:
(1) Thin dense films were prepared, e.g., by casting, with a spreading knife, a 10% solution of cellulose acetate having covalently bound ionizable groups attached thereto upon porous fabrics made of nylon, polyester and cotton previously masked with polyvinyl alcohol or carboxymethyl cellulose at a thickness of 1 mm. After drying, the selective membrane (having a thickness of 2–20 microns) was obtained upon this support. The masking layer was dissolved in water after incorporation into the ED stack.

(2) Asymmetric Loeb-type membranes are known in the art and are made of a supporting main layer and a cover layer of skin, which skin is usually between $0.2\mu$ and $3\mu$ thick.

Preparation of Loeb-type skinned membranes: The skinned membranes were cast from the casting solution including modified cellulose acetate, acetone, and formamide in appropriate proportions. The modified cellulose acetate included positively or negatively charged fixed groups which were covalently bound to the matrix.

(3) Composite membranes are also known in the preparation of Reverse-Osmosis membranes, and are generally prepared by forming a very thin film of polymer directly upon a polyacrylic-acid masked surface of finely porous supporting membranes by dipping from a dilute solution of a polymer. The thickness of the film, which is usually between about 400 Å and 800 Å, is controlled by the withdrawal rate of the support and the concentration of the polymer in the dilute solution.

As stated before, the principle of the novel process and apparatus is based on selective solubilization and/or selective dissociation of some specific ion due to specific interaction with the matrix of the membrane, and not only due to specific complexation with the charged site. As a specific case of this process, this invention relates to selective separation of nitrate ions out of mixture with other ions as described hereinafter in Examples 1 and 5, which separation is preferably achieved by the selection and use of a membrane characterized by a low dielectric constant in the range of about 2 to 7, prepared as described hereinafter with reference to example 1 and is also related to the separation of low molecular weight organic substances out of mixture with other ions as described in Example 4.

EXAMPLE 1

Preparation of charged cellulose acetate with covalently bound ionizable groups

The charging of cellulose acetate was performed in two stages:
a. Esterification of primary hydroxyl groups by means of p-toluenesulfonyl chloride (tosyl chloride); and
b. Substitution of the tosyl group by a tertiary nitrogen containing group such as pyridine, isoquinoline, tributyl amine or benzyl pyridine.

Thus:
A. Tosyl chloride 106 gr and cellulose acetate (Eastman 398-10) 20 gr. were separately dissolved in 240 and 115 ml respectively of distilled dry pyridine. The solutions were mixed and left at room temperature for 3 hours. After this time, the mixture was cooled to 0° and mixed with an equal volume of ice-cold acetone containing more than sufficient water to decompose the excess tosyl chloride. After 5 minutes of mixing in a bath at 0° C., the mixture was stirred into 6.5 liters of distilled water and 20 minutes later, the precipitate was filtered, washed well and dried in a vacuum oven at 90° C.

B. Charging of CA-tosylate
1. Charging with Pyridine
3 gr. CA-tosylate was dissolved in 60 ml pyridine. The mixture was heated to 90° and left at this temperature for 24 hours. The mixture which was isolated after 4 hours was added to 1% NaCl solution with stirring. The formal precipitate was filtered, washed well with water and dried in a vacuum oven at 90° overnight.

This polymer was used for the preparation of a thin, dense film membrane coated upon a porous support as described hereinbefore and was designated Ca-T-1.

2. Charging with isoquinoline
3 gr. CA-tosylate was dissolved in 44 ml isoquinoline, which was previously distilled over BaO. The solution was mixed to 100° and left at this temperature for 2 hours after which it was added to an excess of ether, while being stirred continuously. The resulting precipitate was filtered immediately, washed with excess ether and dried in a vacuum oven at 100° C.

The resulting polymer was cast as an asymmetric Loeb-tye membrane from a solution containing 25% of the polymer, 45% acetone and 30% formamide and designated CA-S-1.

3. Charging of CA-tosylate with benzyl pyridine
In a similar manner charging with benzyl pyridine was performed however the resulting polymer was cast in a composite form by pulling masked acropore (®) filter (from Gellman Co.) from a 5% solution of said polymer in chloroform. A thin selective membrane having about 1 micron thickness was created upon the support and said composite membrane was designated CA-C-1.

4. Charging of CA-tosylate with tributyl amine
CA-tosylate (2 gr) was dissolved in dioxane (270 ml). The mixture was refluxed for a few minutes, after which tributyl amine (31.2 gr) was added and refluxing continued for 1 day. 30 ml of the sample was added to 2% NaCl solution (200 ml) while stirring. The precipitate was collected over a sinter glass funnel, washed several times with petroleum ether till no tributyl amine odor was left. The polymer was dried in vacuum at 60° C., and used for the preparation of a thin dense film membrane as hereinbefore described and designated CA-T-2.

Electrodialysis experiments were performed in a laboratory multi-cell pair stack. The dialysate cell included anion and cation exchange membranes, separated by a spacer and stacked together in a tight frame to ensure absence of hydraulic leaks. A volume of the dialysate solution comprising 10 mMoles/Liter of NaCl and 1 mMole/Liter $NaNO_3$ was continuously fed and circulated between the membranes at a preset flow rate by means of a peristaltic pump for a period of 500 hrs without any appreciable decrease in initial performance. The electric current transferred through the two electrodes was supplied by constant current supply. The direction of the current was chosen to draw the anions from the dialysate cells through the anion exchange membranes and cations through the cation exchange membranes, thus resulting in a decrease of salt concentration in the dialysate solutions.

The cation exchange membrane assembled in the stack was commercial permselective Selemion CMV type. The anion exchange membranes were nitrate selective membranes according to the present invention, assembled into the stack and are listed in the following Table 1 together with their % of nitrate removal out of a mixture containing a 10-fold excess of chloride ions over nitrate ions in comparison with three commercially available electrodialysis membranes as well as with regard to their electrical resistance calculated per membrane thickness of 1 micron in units of ohm.cm².

TABLE 1

| No. | Membrane | Nitrate selectivity % | area resistance ohm . cm² |
|---|---|---|---|
| A | Selenion$^R$ (commercial ED membrane) | 6 | — |
| B | Ionac$^R$ (commercial ED membrane) | 7 | — |
| C | AMF$^R$ (commercial ED membrane) | 3 | — |
| CA-T-1 | | 47 | 30 |
| CA-S-1 | | 65 | 40 |
| CA-C-1 | | 52 | 70 |
| CA-T-2 | | 70 | 80 |

COMPARATIVE EXAMPLE 2

Preparation of a thin, dense nitrate selective membrane containing embedded polymeric additives.

A solution of 5% of cellulose triacetate in chloroform containing 1% by weight of polyvinyl benzyl tributyl-ammonium chloride additive was prepared. A porous plate made of Nucleopore porous filter of 1μ pore diameter was masked with a solution of carboxymethyl cellulose, then immersed into the casting solution and pulled out with a withdrawal rate of 1 cm per minute. After evaporation of chloroform a thin selective film having polyvinyl benzyl tributyl-ammonium chloride embedded therein was formed.

Said membrane was tested under the conditions set forth in example 1 and while the selectivity was found to be 70% its area resistance calculated per membrane thickness of 1 micron was found to be 400 ohm cm² which results in a commercially unacceptable consumption of energy rendering said membrane unsuitable for industrial application.

COMPARATIVE EXAMPLE 3

Preparation of a thin dense nitrate selective membrane containing embedded low-molecular weight-ionizable groups A solution of 5% of cellulose tri-acetate in chloroform containing 5% by weight of tetrahexylammonium iodide was prepared. A porous plate made of Nucleopore porous filter of 1μ pore diameter was masked with a solution of carboxymethyl cellulose, then immersed into the casting solution and pulled out with a withdrawal rate of 1 cm per minute. After evaporation of chloroform, a thin selective film having tetrahexylammonium iodide embedded therein was formed. The resistance of said membrane having a thickness of about 1 micron was found to be approximately 19 ohm cm².

Said membrane was tested under the conditions set forth in example 1 and while the initial nitrate selectivity found was 42% after ten hours of continuous experiment the selectivity was found to be under 10% and analysis of the membrane at said point disclosed that the concentration of the embedded ionizable groups was reduced to less than 10% of its initial value.

EXAMPLE 4

Selective transport of low molecular weight organic and inorganic substances with respect to chloride ion A set-up identical to that described in Example 1 was used, using membrane CA-T-2 in order to measure transport of three ions out of equimolar mixtures with chloride ions.

a. 90% of Picrate ion was transported out of a mixture of 1 mM/L Na Pic and 1 mM NaCl;
b. 70% of Iodide ion was transported out of a mixture of 1 mM/L NaI and 1 mM/L NaCl.
c. 60% of oxalate ion was transported out of the solution of 1 mM/L NaOxalate+2 mM/L NaCl.

EXAMPLE 5

The procedure of example 1 was repeated using a mixture containing 3 mMoles NaCl, 1.0 mMoles NaNO$_3$, 4 mMoles of NaHCO$_3$ and 1 mMole Na$_2$SO$_4$ and membrane CA-C-1.

After operating the system for several hours, the analysis of the dialysate and brine compartment revealed that the transport of nitrate ions was close to 60%, that of chloride ions close to 30% and that of a bicarbonate ions about 10%. No sulfate ions transport was detected. For comparison, the same experiment was performed with the same three commercially available anion exchange membranes mentioned in example 1 incorporated within the stack instead of the nitrate selective membranes, with the following results: transport of nitrate ions about 12%, that of chloride ions 54%, 23% of bicarbonate ions, and 10% of sulfate ions were transported from the dialysate into the brine streams.

As will be realized from the above results not only does the method of the present invention allow for the selective removal of nitrate ions but it also achieves this result while preventing the simultaneous removal of bicarbonate and sulphate ions into the brine thus eliminating the severe problem of scale formation in the nitrate concentrating compartment.

An added advantage of the above described water-purification process for the removal of nitrates is that the resulting brine is exceptionally rich in nitrate content and ideally suited for irrigation and fertilization of agricultural fields, thus eliminating the necessity for brine disposal and the cost inherent therein.

It will be evident to those skilled in the art that the invention is not limited to the details of the foregoing illustrative embodiments and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A selective electrodialysis unit for the performance of selective electrodialytic separation of a first group of charged ions from a solution containing other charged ions having the same sign as said first group comprising at least one thin, dense non-porous charged electrodialysis membrane made of water-insoluble hydrophobic polymeric material containing covalently bound ionizable groups, wherein said membrane separates at least one diluting compartment from at least one concentrating compartment in said unit and wherein said membrane is in the form of a polymeric matrix optionally supported on a porous support and having a dielectric constant and composition preselected to induce selective ion dissociation of said first group of charged ions upon the passage of current therethrough, and thereby to effect a substantial ion migration of said selected ion group from at least one diluting compartment to at least one concentrating compartment in said unit and its preferrential transference across said membrane at a fraction larger than its relative concentration in solution.

2. A selective electrodialysis unit according to claim 1 adapted for the treatment of an aqueous stream containing nitrate, bicarbonate and sulphate ions and for the selective transportation of nitrate ions from the diluting to the concentration compartments of said unit without accompanying transport of said bicarbonate and sulphate ions whereby the problem of scale formation on said unit is substantially reduced.

3. A selective electrodialysis unit according to claim 1, wherein said membrane is selected from the group consisting of assymetric, composite and thin supported charged membranes.

4. A selective electrodialysis unit according to claim 1, wherein said first group of charged ions are nitrate ions.

5. A selective electrodialysis unit according to claim 4, wherein said first group of charged ions are selected from the group consisting of positively or negatively charged organic molecules.

6. A selective electrodialysis unit according to claim 1, wherein said membrane is characterized by a low dielectric constant in the range of about 2 to 7.

7. A selective electrodialysis unit according to claim 1, adapted for the treatment of an aqueous stream containing nitrate, bicarbonate, chloride and sulphate ions, and for the selective transportation of nitrate ions from the diluting to the concentrating compartments of said unit without accompanying transport of said bicarbonate, chloride and sulphate ions for producing a concentrated brine rich in nitrate ions which can be used for fertilization purposes.

* * * * *